United States Patent
Stecher

(10) Patent No.: US 9,106,412 B2
(45) Date of Patent: Aug. 11, 2015

(54) DATA PROTECTION USING PROGRAMMATICALLY GENERATED KEY PAIRS FROM A MASTER KEY AND A DESCRIPTOR

(71) Applicant: McAfee, Inc., Santa Clara, CA (US)

(72) Inventor: Martin Stecher, Paderborn (DE)

(73) Assignee: McAfee, Inc.

( * ) Notice: Subject to any disclaimer, the term of this patent is extended or adjusted under 35 U.S.C. 154(b) by 113 days.

(21) Appl. No.: 13/791,462

(22) Filed: Mar. 8, 2013

(65) Prior Publication Data

US 2014/0258730 A1  Sep. 11, 2014

(51) Int. Cl.
- *G06F 21/62* (2013.01)
- *H04L 9/08* (2006.01)
- *G06F 21/60* (2013.01)

(52) U.S. Cl.
CPC ............ *H04L 9/0861* (2013.01); *G06F 21/602* (2013.01); *G06F 21/6209* (2013.01)

(58) Field of Classification Search
None
See application file for complete search history.

(56) References Cited

U.S. PATENT DOCUMENTS

| | | |
|---|---|---|
| 5,778,069 A | 7/1998 | Thomlinson et al. |
| 6,687,375 B1 * | 2/2004 | Matyas et al. ............... 380/45 |
| 6,940,976 B1 * | 9/2005 | Matyas et al. ............... 380/44 |
| 2006/0104441 A1 | 5/2006 | Johansson et al. |
| 2008/0127314 A1 | 5/2008 | Rowley |
| 2011/0173435 A1 * | 7/2011 | Liu et al. ............... 713/150 |

FOREIGN PATENT DOCUMENTS

| | | |
|---|---|---|
| JP | 2006-235995 A | 9/2006 |
| KR | 10-2008-0063510 A | 7/2008 |

OTHER PUBLICATIONS

Gina Stevens et al., Privacy: An Overview of Federal Statuses Governing Wiretapping and Electronic Eavesdropping, 2003, Congressional Research Service Library of Congress, pp. 1-85.*
Xiang Tian et al., Mersenne Twister Random No. Generation on FPGA, CPU and GPU, 2009, IEEE Computer Society, NASA/ESA Conference on Adaptive Hardware and Systems, pp. 460-464.*
Francois Panneton et al., Improved Long-Period Generators Based on Linear Recurrences Modulo 2, 2006, ACM Transactions on Mathematical Software, vol. 32, No. 1, pp. 1-16.*
International Search Report and Written Opinion received for PCT Patent Application No. PCT/US2014/020721, mailed on Jun. 19, 2014, 15 pages.

* cited by examiner

*Primary Examiner* — Jung Kim
*Assistant Examiner* — Adrian Stoica
(74) *Attorney, Agent, or Firm* — Blank Rome LLP.

(57) ABSTRACT

Systems and methods are disclosed for allowing an authority to monitor a computer user's information in a most palatable manner for the computer user. The authority is provided access to information with encrypted user identification information and the user is notified if decryption is facilitated. The systems and methods also include a novel key production system whereby large numbers of deterministic key pairs may be created for use in the monitoring system.

18 Claims, 10 Drawing Sheets

DATA PROTECTION USING PROGRAMMATICALLY GENERATED KEY PAIRS FROM A MASTER KEY AND A DESCRIPTOR

FIELD OF THE DISCLOSURE

The disclosure relates to systems and methods for allowing an authority to monitor a computer user's information in a most palatable manner for the computer user. In addition the disclosure relates to several innovative mechanisms useful in monitoring computer users.

BACKGROUND OF THE DISCLOSURE

In the context of contemporary computing environments, there are many situations where a person or authority may have access to a computer user's (or custodian's) electronically stored information. For example, a corporate employee may possess a computer (e.g. a PC, phone or tablet) upon which there is stored information of a confidential or sensitive nature. The subject information may be sensitive to either or both of the corporation and employee. Due to the requirements upon the corporation or the relationship between the corporation and the employee, authorities (at the corporation or otherwise) may have access to the sensitive information. Of course, the extent and manner of access to this information may be controversial with an employee, but necessary or very desirable in view of the corporation or another authority (e.g. law enforcement or a government entity). The situation may be awkward or possibly damaging to the employee-employer relationship. This is especially so because the employee often has no knowledge whether the corporation has accessed the information. Furthermore, this difficult situation may arise in a variety of contexts such as between a parent and child, a school and its students, or even in the supervision of civil or criminal litigants by authority such as a state.

A classic example of the situation described is when an employer (e.g. one potential authority) has a policy that requires monitoring the Internet access of it employees (e.g. users, custodians, or computers). In order to mitigate the privacy concerns of employees, the employer's privacy policy may offer that the employer will not access or use the data (e.g. user Internet access logs) without appropriate justification, such as a legal requirement. Even if the employer's policy offers such an accommodation, the employee may be uncomfortable with the possibility that private information is being revealed without any notice or warning.

DETAILED DESCRIPTION

The inventive embodiments described herein may have implication and use in all types of single and multi-processor computing systems. Most of the discussion herein focuses on common computing configurations having a CPU resource including one or more microprocessors. The discussion is only for illustration and not intended to confine the application of the invention to other systems having either other known or common hardware configurations. With that caveat, we shall provide information regarding a typical hardware and software operating environment.

Figure 1:
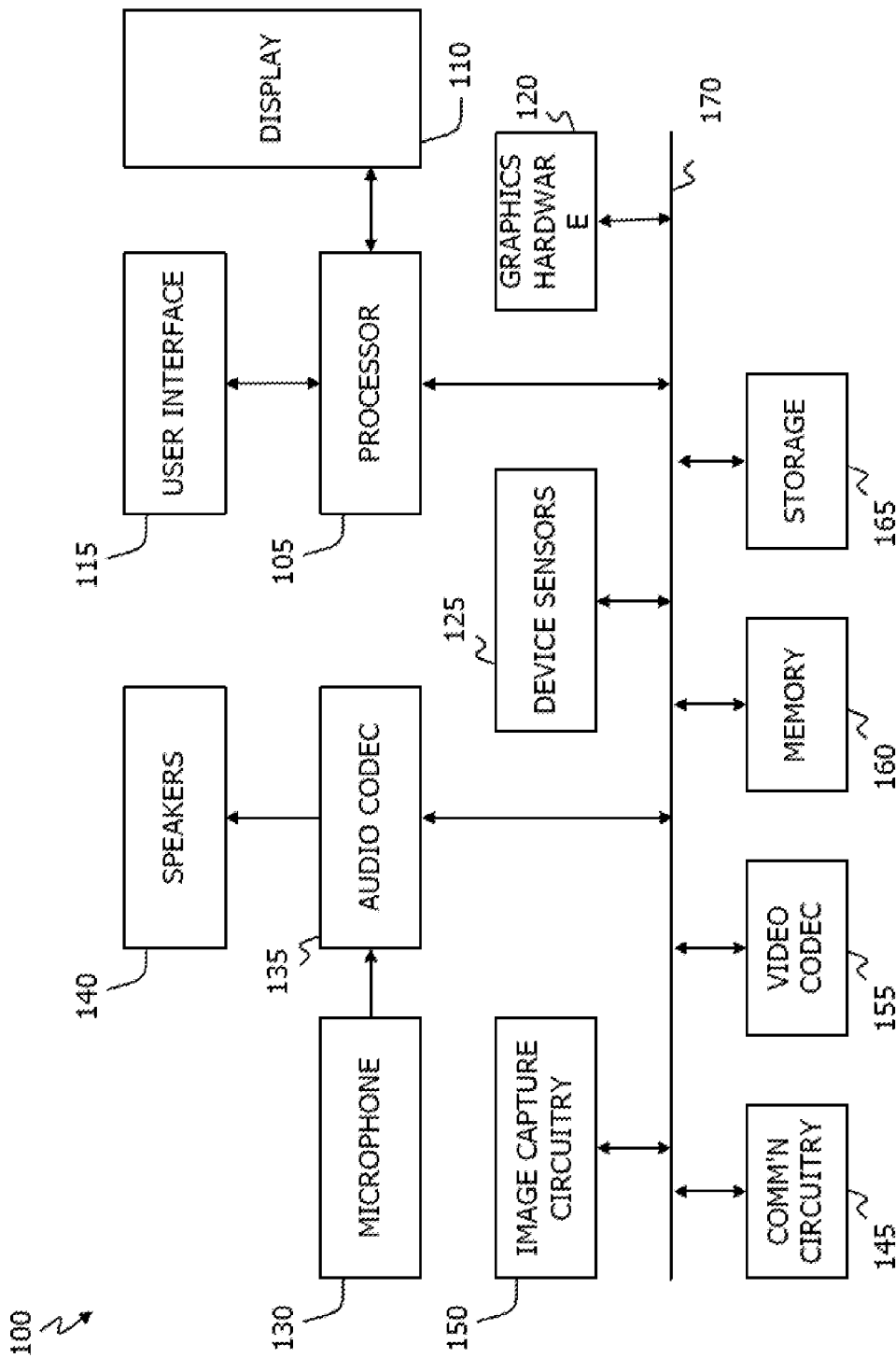
FIG. 1 is a sample hardware configuration that may be employed in embodiments.

Referring to FIG. 1, a simplified functional block diagram of illustrative electronic device 100 is shown according to one embodiment. Electronic device 100 could be, for example, a mobile telephone, personal media device, portable camera, or a tablet, notebook or desktop computer system or even a server. As shown, electronic device 100 may include processor 105, display 110, user interface 115, graphics hardware 120, device sensors 125 (e.g., proximity sensor/ambient light sensor, accelerometer and/or gyroscope), microphone 130, audio codec(s) 135, speaker(s) 140, communications circuitry 145, digital image capture unit 150, video codec(s) 155, memory 160, storage 165, and communications bus 170. Electronic device 100 may be, for example, a personal digital assistant (PDA), personal music player, a mobile telephone, or a notebook, laptop or tablet computer system.

Processor 105 may execute instructions necessary to carry out or control the operation of many functions performed by device 100 (e.g., such as the generation and/or processing of encryption, encryption keys and/or privacy policies). In general, many of the functions performed herein are based upon a processor acting upon software embodying the function. Processor 105 may, for instance, drive display 110 and receive user input from user interface 115. User interface 115 can take a variety of forms, such as a button, keypad, dial, a click wheel, keyboard, display screen and/or a touch screen. Processor 105 may be a system-on-chip such as those found in mobile devices and include a dedicated graphics processing unit (GPU). Processor 105 may be based on reduced instruction-set computer (RISC) or complex instruction-set computer (CISC) architectures or any other suitable architecture and may include one or more processing cores. Graphics hardware 120 may be special purpose computational hardware for processing graphics and/or assisting processor 105 process graphics information. In one embodiment, graphics hardware 120 may include a programmable graphics processing unit (GPU).

Sensor and camera circuitry 150 may capture still and video images that may be processed to generate images to be used as data or private data in accordance with the teachings herein. Output from camera circuitry 150 may be processed, at least in part, by video codec(s) 155 and/or processor 105 and/or graphics hardware 120, and/or a dedicated image processing unit incorporated within circuitry 150. Images so captured may be stored in memory 160 and/or storage 165. Memory 160 may include one or more different types of media used by processor 105, graphics hardware 120, and image capture circuitry 150 to perform device functions. For example, memory 160 may include memory cache, read-only memory (ROM), and/or random access memory (RAM). Storage 165 may store media (e.g., audio, image and video files), computer program instructions or software including database applications, preference information, device profile information, and any other suitable data. Storage 165 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 160 and storage 165 may be used to retain computer program instructions or code organized into one or more modules and written in any desired computer programming language. When executed by, for example, processor 105 such computer program code may implement one or more of the method acts or functions described herein, which may be reduced to code and stored in memory prior to execution.

Figure 2:
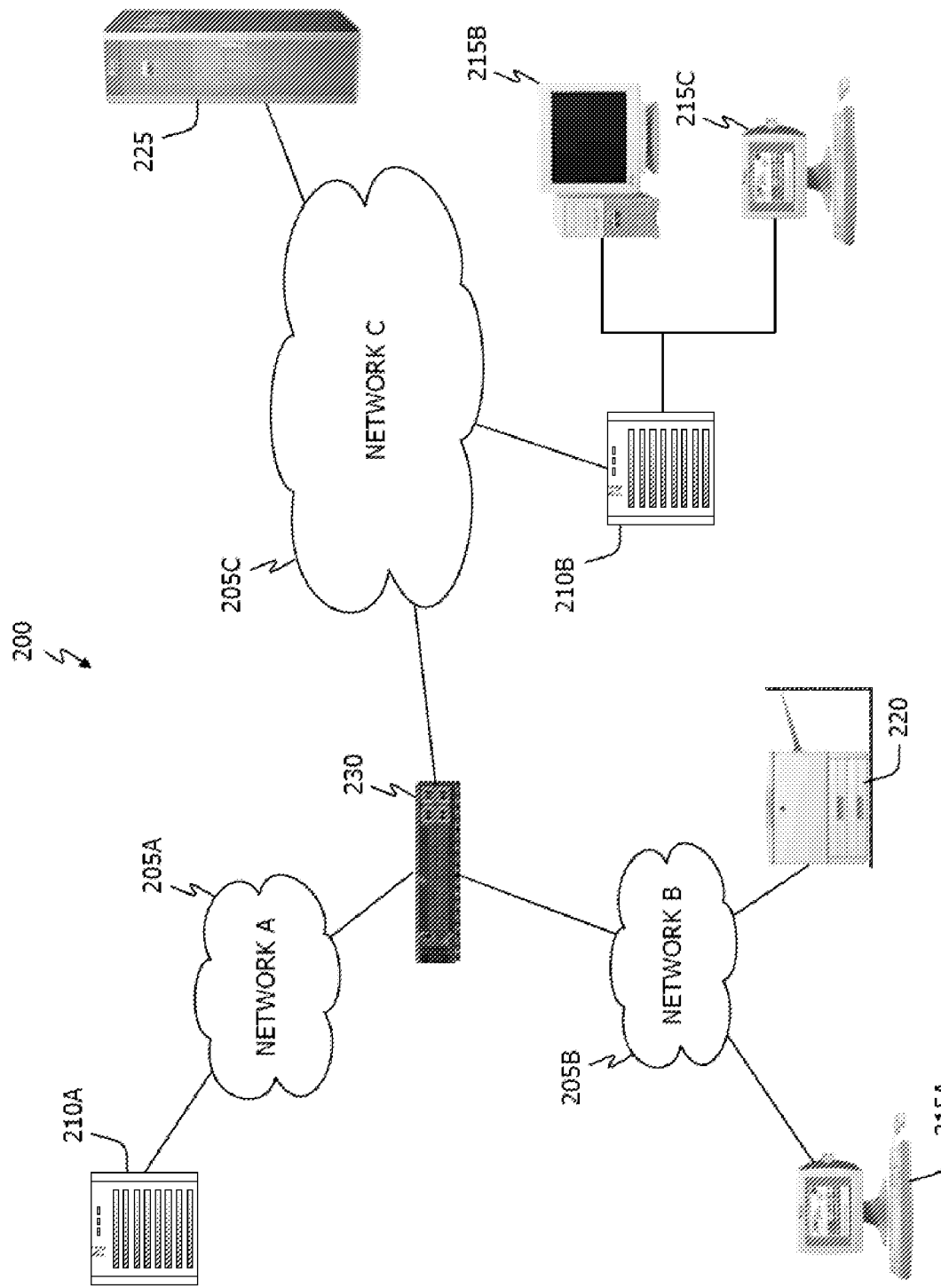
FIG. 2 is a sample network and hardware configuration that may be employed in embodiments.

Referring now to FIG. 2, illustrative network architecture 200 within which the disclosed techniques may be implemented includes a plurality of networks 205, (i.e., 205a, 205b and 205c), each of which may take any form including, but not limited to, a local area network (LAN) or a wide area network (WAN) such as the Internet. Further, networks 205 may use any desired technology (wired, wireless or a combination thereof) and protocol (e.g., transmission control protocol, TCP). Coupled to networks 205 are data server computers 210 (i.e., 210a and 210b) that are capable of operating server applications such as databases and also capable of communicating over networks 205. Also coupled to networks 205, and/or data server computers 210, are end-user computers 215 (i.e., 215a, 215b and 215c), which may take the form of any computer, set top box, entertainment device, communications device or intelligent machine, including embedded systems. In some embodiments, network architecture 210 may also include network printers such as printer 220 and storage systems such as 225, which may be used to store enhancements (including multi-media items) that are referenced in databases discussed herein. To facilitate communication between different network devices (e.g., data servers 210, end-user computers 215, network printer 220 and storage system 225), at least one gateway or router 230 may be optionally coupled there between. Furthermore, in order to facilitate such communication, each device employing the network may comprise a network adapter. For example, if an Ethernet network is desired for communication, each participating device must have an Ethernet adapter or embedded Ethernet capable ICs. Further, the devices must carry network adapters for any network in which they will participate.

As noted above, embodiments of the inventions disclosed herein include software. As such, we shall provide a description of common computing software architecture as expressed in layer diagrams of FIG. 3. Like the hardware examples, the software architecture discussed here is not intended to be exclusive in any way but rather illustrative. This is especially true for layer-type diagrams, which software developers tend to express in somewhat differing ways. In this case, the description begins with layers starting with the O/S kernel so lower level software and firmware has been omitted. The notation employed here is generally intended to imply that software elements shown in a layer use resources from the layers below and provide services to layers above. However, in practice, all components of a particular software element may not behave entirely in that manner.

Figure 3:
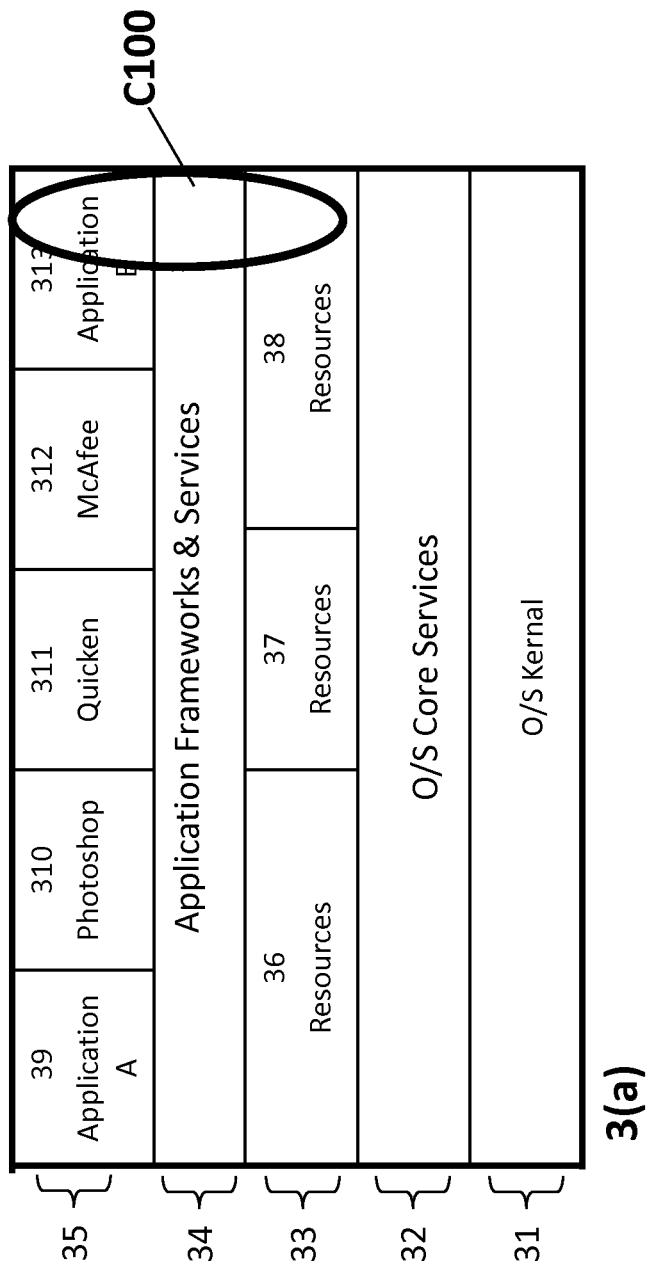
FIG. 3 is a software illustration that illuminates aspects of certain embodiments.

With those caveats regarding software, referring to FIG. 3 (a), layer 31 is the O/S kernel, which provides core O/S functions in a highly protected environment Above the O/S kernel, there is layer 32 O/S core services, which extend functional services to the layers above such as disk and communications access. Layer 33 is inserted to show the general relative positioning of resource frameworks such as open GL and similar resources (e.g. resources in the layer might provide cryptography APIs or mathematical functions used in cryptography). Layer 34 is an amalgamation of functions typically expressed as multiple layers: applications frameworks and application services. For purposes of our discussion, these layers provide high-level and often functional support for application programs which reside in the highest layer shown here as item 35. A security or cryptography framework would likely reside in layer 33 or 24 or both. Item C100 is intended to show the general relative positioning of the client side software employed for some embodiments of the current invention. While the ingenuity of any particular software developer might place the functions of the software described at any place in the software stack, the client side software hereinafter described (e.g. email and user/computer notification) is generally envisioned as user facing (e.g. in a user application) and/or as a resource for user facing applications to employ functionality related to collection of crowd source information or display of enhanced video features as discussed below. On the server side, the inventions and software described herein (e.g. managing data and keys and enforcing policies) may implemented in varying embodiments including server application level software, databases software and both frameworks and resource modules.

No limitation is intended by these hardware and software descriptions and the varying embodiments of the inventions herein may include any manner of computing device such as Macs, PCs, PDAs, phones, smart phones, tablets, servers or even embedded systems.

Figure 4A:
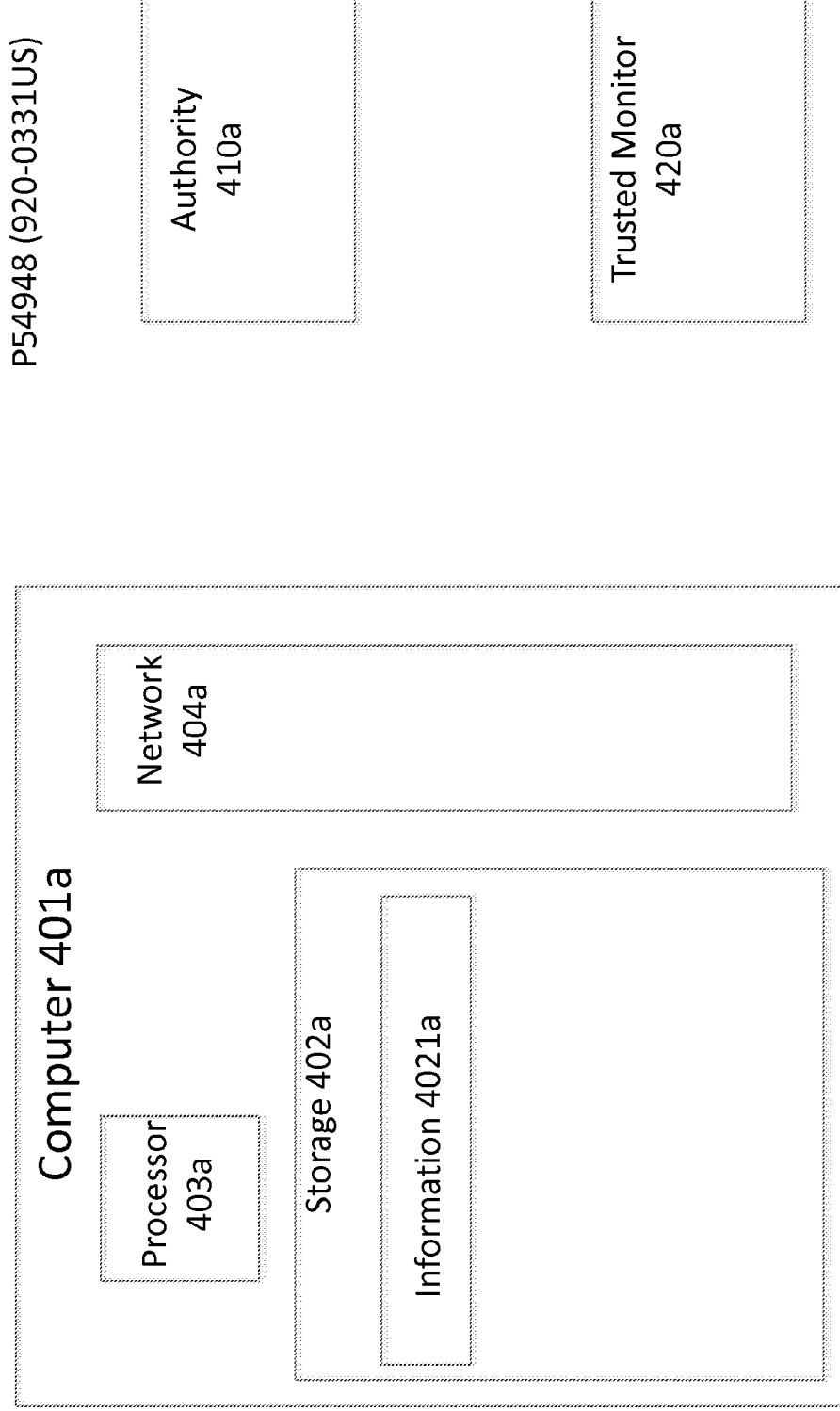
FIG. 4a is an embodiment of the invention related to allowing access to user information and providing notice to the user.

Referring to FIG. 4a, one basic embodiment is shown including a user computer 401a, an authority, 410a and a trusted monitor 420a. In some embodiments the authority 410a will have a pre-existing relationship with the user or custodian of the computer 401a. For example, the authority might be an employer and the user/custodian might be an employee. The innovations discussed herein can apply to any relationship, but some other expressly contemplated possibilities are as follows: vendor and customer, partner and partner, government entity and citizen (or any person or entity governed thereunder); law enforcement entity and citizen (or any person or entity under the jurisdiction of the law enforcement entity); school and student; contractee and contractor; or, organization and volunteer.

Regardless of the particular relationship between authority 410a and the user/custodian of computer 401a, there may be a desire or requirement for authority 410a to monitor some or all aspects regarding the use of computer 401a. In order to facilitate monitoring, computer 401a may be suitably equipped as described with respect to FIG. 1 above. For illustrative purposes computer 401a is shown with: memory such as storage 402a; a microprocessor such as processor 403a; a network adapter (e.g. Ethernet, GSM, LTE, CDMA, Bluetooth, WiFi) such as network 404a; operating software that is not shown; application software that is not shown; and one or more software modules to assist with monitoring computer users as described herein; the software modules usually being stored in a volatile (e.g. DRAM) or non volatile (e.g. magnetic disk or FLASH) memory.

In connection with the relationship between authority 410a and the user/custodian of computer 401a, the authority may monitor information stored on computer 401a such as information 4021a. The authority may also monitor information that is accessed by computer 401a, which may be observed in a stored access log or by observing actual I/O activity. Some examples of accessed information include items sent and received electronically such as Internet access, email, phone calls, texts, networked games, shared documents, sensor readings, audio communications or multi-media communications, etc. Whether monitoring stored information or accessed information, the data to be monitored may be represented in a stored file or other data object such as information 4021b. If a monitored system does not itself log or store a particular form of communication, a monitoring software module may be employed. In addition, depending upon the situation, a monitored data store needn't be found on the computer of the user/custodian being monitored. For example, referring now to FIG. 4b, user computers 450b may communicate through a service provider represented here by computer 401b. In this arrangement, the service provider computer (or group of computers and equipment) may monitor information accessed by each user/computer 450b and create one of more log files represented by information 4021b. One example may be an Internet service provider that may maintain log files for all the Internet access of its customers. Another example may be a cell phone provider that may maintain phone call logs and Internet access logs for all of its customers. As yet another example, a company or employer may maintain logs of all or select communication to and from the various communication devices in a facility or deployed within the company's network reach. Thus, in discussing the monitoring of users/custodian's herein, the discussion is equally applicable to situations where the physical machines subject to monitoring are not the machines of the users and/or custodians whose information is under evaluation.

Referring again to FIG. 4a, some embodiments of the invention assume that authority 410a has physical access to information 4021a. Thus, in applying privacy or security relating to computer 401a, information 4021a may be encrypted. In this manner, Authority 410a's physical access to information 4021a may not provide intellectual access. In addition, by using encryption, embodiments of the invention may employ key management or key policies to achieve the desired level of privacy or security. With reference to FIG. 4a, there is shown trusted monitor 420a, which provides a trusted third party for facilitating key management and/or policy implementation. Using the arrangement shown in FIG. 4a along with a public/private key pair, computer 401a may employ a public key to encrypt data of information 4021a. The private key may be securely maintained by trusted monitor 420a. If authority 410 requires access to the encrypted information, there are at least two ways to facilitate such access.

In order to facilitate access, in some embodiments, Authority 410a may request the private key from trusted monitor 420a. Trusted monitor 420a may log the event along with any known consequences regarding the data that may be compromised. This log may be available to any affected user such as the custodian of computer 401a. Further, having the private key, authority 410a may intellectually access the data as desired. These embodiments (wherein the trusted monitor simply provides a private key) have the advantage of never trafficking data to and from the trusted monitor or compromising data with respect to the trusted monitor.

In other embodiments, in order to facilitate the authority's access, when authority 410a requires decryption, the encrypted data (along with appropriately identifying information such as metadata) is passed to trusted monitor 420a (e.g. the authority may request information directly from the trusted monitor or indirectly through the monitored computer (s) or person). In these embodiments, the trusted monitor performs the decryption and passes the data back to the authority in a form that may be intellectually accessible by authority 410a (e.g it may be clear text or encrypted to the authorities private key, etc.). These embodiments (wherein the trusted monitor performs the decryption) have the advantage of allowing the monitor to log the precise data the authority accessed so that information may be available for potentially affected users. These embodiments have the further advantage of obviating any risk that the authority will decrypt all information tied to a particular key.

Figure 4B:
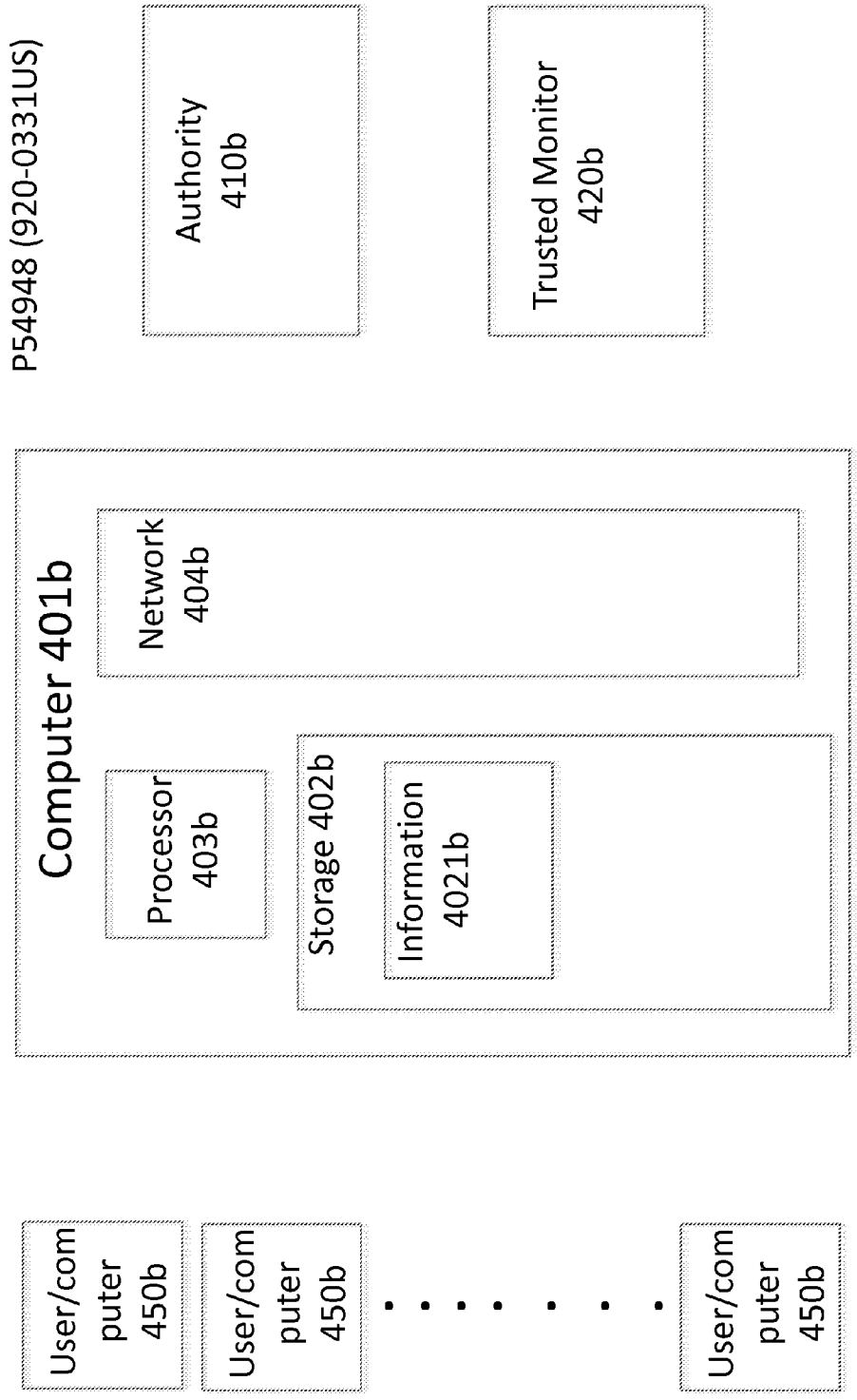
FIG. 4b is another embodiment of the invention related to allowing access to user information and providing notice to the user.

Referring now to FIG. 4b, there is shown an arrangement similar to FIG. 4a with the notable addition of user/computers 450b. As a consequence of the additions, embodiments related to FIG. 4b may illustrate the protection or disclosure of data sensitive to the user/computers 450b. In such embodiments, computer 401b may be employed to illustrate an employer or service provider (e.g. Internet service provider or email provider) for the user/computers 450. As such, Computer 401b may aggregate sensitive information of multiple users/computers 450 and may serve as an "authority" itself, with or without the addition of authority 410b. This is because a service provider or employer may employ privacy policies that allow access to certain customer or employee information for business purposes. Of course, the service provider or employer may desire or have requirements to access customer data on behalf of government entities such a law enforcement. Thus, in embodiments including a service provider, employer or similar aggregator, there may be two authorities or the role of authority may be split.

With reference to FIGS. 4a and 4b, the representations of authority 410 and trusted monitor 420 are intended proxies for both the persons/entities and computer systems and equipment that logically embody those roles as described herein. For example, either authority 410 or trusted monitor 420 may represent one or more computers and network equipment that are either distributed or co-located as generally illustrated in the hardware description above. Furthermore, in some embodiments, the functions of trusted monitor 420 may be embodied in trusted monitor software residing on computers or network equipment co-located with authority 410 or upon computer 401. Further, to achieve full functionality, such trusted monitor software may require communication with an Internet or network resident services platform.

Some embodiments use key pairs in the form of public/private key encryption. In particular, public/private key systems generally provide that a user/custodian has a public key that others may use to encrypt data that is being sent or provided to the user/custodian. The private key is typically unique to the user/custodian and kept confidential because it is the decryption key for decrypting data that has been encrypted with the paired public key. Using this system, any number of third parties might possess a user/custodian's public key so they can encrypt data that only the user/custodian may access through decryption with the paired private key.

In order to further enhance security, some embodiments call for periodically rolling (i.e. changing) the key pairs. Security and privacy are enhanced by changing key pairs because the use or theft of any particular decryption key only compromises the data encrypted with the paired public key. Generally, if keys are rolled more frequently, then less data will be compromised for each key. Some embodiments call for the keys to be rolled based upon a fixed or formulaic time period (e.g. every hour, day, week or month). Other embodiments call for rolling the keys based upon events or thresholds, such as the amount of encrypted data or system events such as I/O events.

While not strictly necessary, as discussed above, many embodiments employ public/private key pairs and some of the embodiments may require frequent key rolling in order to limit the amount of data compromised by the disclosure of any one decryption key (e.g. a system where every Internet log entry or 10 entries is separately keyed). Therefore, some embodiments may require large numbers of key pairs for each customer/user/custodian. Thus, in some embodiments, rather than store large numbers of keys in computer memory, key pairs may be created as needed. For these embodiments, it may be desirable for all keys to be deterministic and computable if the value of a master key is known. Conversely, if the value of the master key is not known, then the key pair values should be difficult or impossible to determine.

Figure 5:
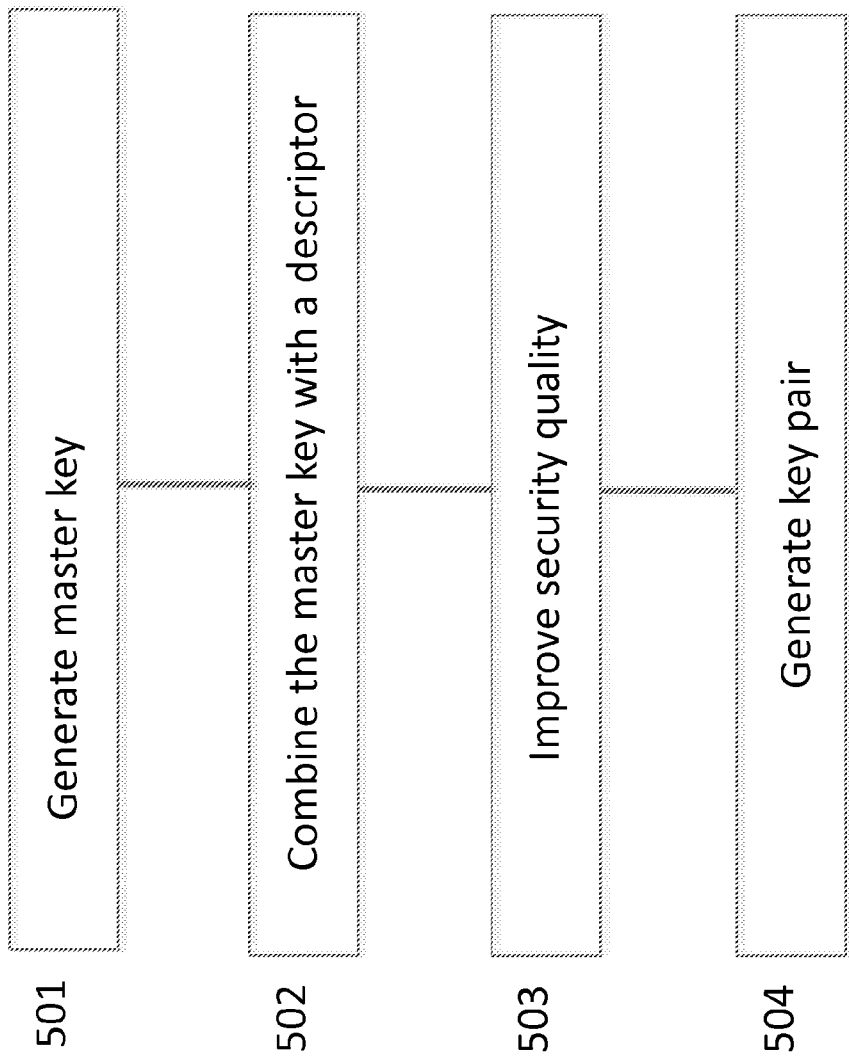
FIG. 5 is a process according to the invention related to generating keys.

In some embodiments the process for generating keys follows the flow chart shown in FIG. 5. The presentation of this flow chart (or others herein) does not imply a strict necessity that the acts are performed in the order presented. Any preferred or necessary ordering of the acts will be either stated expressly or functionally necessary.

In act 501a master key is generated or otherwise acquired and then stored in a computer memory. One or more embodiments may employ a random master key and the process for generating the master key may be any current or future known process in cryptography, mathematics or otherwise. In certain embodiments, a 2496 byte random number is employed as the master key. Further, in some of those embodiments, the size of the random key may correspond to the size of a seed value of a pseudo random generator used later to create key pairs. For example, the master key may be: the exact size of the seed value; or, a pre-determined size smaller or larger than the seed value such that it may be combined with another quantity for creating the seed (e.g. fractioned, concatenated, or fractioned and then concatenated or otherwise combined with another value). In addition, the master key may be securely stored, so for example, it may be used later to make other encryption and decryption keys, such as public/private key pairs. For example, a master key may correspond with a user or computer or customer and each time a public or private key is required for that user or computer or customer, the master key may be employed to create the public/private key(s).

In addition to acquiring a master key, some embodiments of the invention employ a descriptor that may be used to combine with the master key. A descriptor is a quantum of information such as numbers or characters. In some embodiments, the descriptor is derived from a policy or set of rules. For example, the descriptor may be the date and/or time expressed in a specified numerical format (e.g. MMYYYY or DDMMYYYY or hhmmssDDMMYY). Further, the rules or policy may dictate that the descriptor changes every day, week or month at certain time (e.g. midnight GMT). In other embodiments, the descriptor may be derived from the information that is being protected. For example, a log entry date, the name of a file or any metadata associated with the file may be used as a descriptor. Still other embodiments may employ a combination of the foregoing, such as a set of rules for using time/date or metadata information depending upon externally observed circumstances. For example, a rule or policy may require: using time/date data as a descriptor for log entries; using filename or meta information as a descriptor for media files; and using a specified hash value of a text file as a descriptor for text files. Of course, by way of example, a descriptor may be any combination of the foregoing as well. Finally, in some embodiments, a deterministic descriptor is valuable or required. In particular, some embodiments call for creating keys on-demand in order to eliminate or minimize the storage of keys. As will be evident later, in those embodiments, in order to generate appropriate keys, a system will require the correct descriptor. Thus, the descriptor should be deterministic in that it may be derived with certainty from an ascertainable set of circumstances and a policy (e.g. by policy, the time/date of a log entry may result in a descriptor that is the numerically expressed date of the entry—MMDDYY).

Referring again to FIG. 5, once a master key and a descriptor are acquired, in act 502 the two quantities are combined. In some embodiments a 2496 byte master key is used along with a 32 byte representation of the descriptor (e.g. an SHA-256 hash of the descriptor may be employed). In these embodiments, the 32 byte descriptor representation may be used to replace a selected 32 byte portion of the master key, thus yielding a 2496 byte combination. For example, the last 32 bytes of the 2496 byte master key may be replaced with a 32 byte SHA-256 hash of the date and time string associated with a log entry. Of course, the invention contemplates other known mechanisms for combining the master key with the descriptor, such as: using different sizes of the master key to facilitate differing combination techniques; using different or no hash value algorithms to modify the descriptor prior to combination with the master key; using different sizes of the descriptor or hash value of the descriptor to facilitate differing combination techniques; combining the values by concatenating all or defined portions of the descriptor and master key; mathematically combining the values or portions thereof; or hashing a concatenation or mathematical combination.

By combining the master key with the descriptor (e.g. the hash of the descriptor) in act 502, the security quality (e.g. randomness) of the combination is decreased with respect to that of the master key alone because the master key should be generated by a "true" random number generator but the descriptor is a deterministic result of an algorithm. By combining the random master key with a deterministic value, the combination loses some security quality due to the presence of the deterministic component. Thus, in act 503, the security quality of the value may be improved by any known method. Some embodiments improve the security quality by applying a PRNG (pseudo random number generator), which may be deterministic (i.e. that the same input will always yield the same output).

The quality of a PRNG is very high if the resulting sequence of values is fully unpredictable for any consumer of the sequence who does not know the seed of the PRNG. If the PRNG is initiated with only a true random master key seed, a high quality PRNG produces sequences that may be uniformly distributed and not distinguishable from the result of a true random number generator. But in some embodiments hereunder the PRNG is seeded with the combination of the master key and a descriptor that is not random. Thus, as discussed above, the seed value is no longer as strong as a pure random number. As a result, some PRNG offer techniques to increase the quality of the sequence of pseudo random output values. Referring to FIG. 5, at act 503, some embodiments employ such a technique to increase the PRNG output quality thereby improving security. In those embodiments, it is important that those techniques retain the deterministic nature of a PRNG algorithm, i.e. ensure that the same sequence of pseudo-random numbers can be generated when the same seed is re-used.

Further, some embodiments enhance the security quality by applying the PRNG repeatedly, which may increase the pseudo-random quality of the value while allowing it to remain deterministic. For example, the key/descriptor combination may be used to seed a PRNG and the result may be used to seed the PRNG again. Generally, in a set of plural application of the PRNG, the (N+1)th application would use the result created by the Nth application. In applying this principle, one embodiment employs a MersenneTwister as the PRNG and applies the PRNG 700,000 times (e.g. for approximately 700,000 cycles). Based upon the characteristics of the MersenneTwister, the application of approximately 700,000 cycles (i.e. N=700,000), the result will be a well-distributed pseudo-random yet deterministic value. Thus, for some embodiments, it is desirable to use a PRNG and apply the PRNG N times, where the characteristics or specification of the PRNG provide for N applications to achieve a desired degree of pseudo-randomness or security, yet without compromising determinism. Thus, if it is determined that a particular PRNG requires N cycles to achieve a pre-selected degree of security quality, then some embodiments call for performing act 503 using that value for N or a slightly higher number.

Referring to FIG. 5, at act 503, in one embodiment, a PRNG will be seeded using the combination of the master key and the descriptor. Because (in this embodiment) each customer has a unique master key, two customers using the same descriptor will still use different seed values for the PRNG. If the same combination of master key and descriptor is used at a later time, the PRNG will be seeded with the same state. Due to the deterministic behavior of the PRNG, the PRNG will always create the same sequence of output values if it was initialized with the same seed value. In this embodiment, the PRNG is a MersenneTwister and the initial state is set to the 624 32-bit words that correspond to a 2496 bytes of the combination of master key and the descriptor (e.g. as discussed above).

Referring again to FIG. 5, at act 504, a key pair is generated. In some embodiments, a key pair can be generated with the help of a random number generator or pseudo random number generator. In certain embodiments key pair generator uses the PRNG selected and initialized in act 503 above. In some embodiments the key pairs may be RSA key pairs. An RSA key pair is exactly defined by a pair of prime numbers (p, q). Referring to FIG. 5, act 504, the PRNG that is set up in act 503 may be used to create multiple random values (in some embodiments 32 bit random values) of which a big number is constructed. In other embodiments those big numbers may be 512, 1024, 2048 or 4096 bit numbers or may have other lengths. As discussed above, some embodiments require a deterministic algorithm, which is chosen with the big random number as parameter and a prime number as a result. In some embodiments that algorithm may be the calculation of the smallest prime that is larger or equal to the big pseudo random number. That way act 504 may create two prime numbers that define an RSA key pair. The same key pair will be generated if the PRNG algorithm is initiated with the same combination of master key and descriptor and it will create different key pairs for different seed values. For a consumer of the key pair who does not know the master key or the descriptor, the key pair will appear as random as any RSA key pair that has been created traditionally (e.g with a PRNG other than in the process discussed above).

Figure 6:
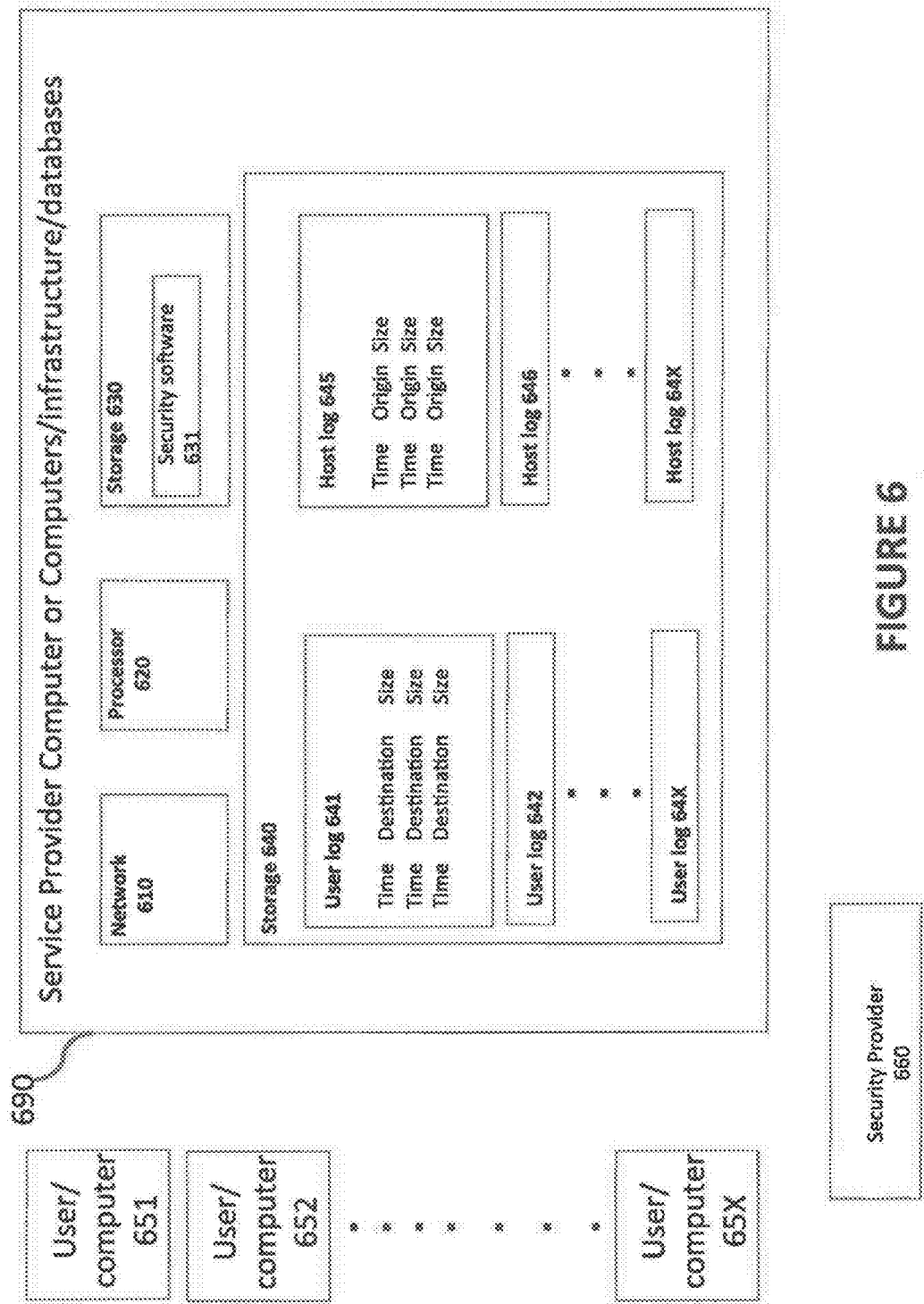
FIG. 6 is an embodiment of the invention related to user information held by a third party such as a service provider.

Referring now to FIG. 6, there is shown a diagram representing series of embodiments that include a service provider 690 having stored records subject to scrutiny or inspection by an authority such as law enforcement. For example, the service provider may be an Internet service provider that provides Internet access for customer user/computers 651 through 65X. In order to serve as an ISP, service provider 690 will have a variety of computer and telecom resources that are known in the art and partially described with respect to FIGS. 1 and 2 above. For summary illustration purposes, FIG. 6 shows that service provider 690 has networking hardware 610 as well as one or more processors 620, program storage 630 (including in some embodiments security software 631), and data storage 640, which may be based upon files, databases or other mechanisms for storing digital data as described with respect to FIGS. 1 through 3 above.

Also referring to FIG. 6, there is shown security provider 660 that manages keys and/or information according to a system as described herein. Physically, security provider 660 may be one or more computers and network equipment as discussed with respect to FIGS. 1 through 3. Thus, for example, the security provider may reside as a cloud resource or it may be embedded in equipment on-site with the service provider (e.g. a server, gateway, router, etc. or part thereof). In some embodiments, security provider 660 may reside off-site from the service provider and may maintain integration through an API relationship with security software 631. In other embodiments, security provider 660 may reside on-premises with the service provider and maintain a level of logical independence, which may be achieved through Internet access to an off-site resource independent of the service provider. Further, even if the security provider 660 is co-located at the service provider, security software 631 may be employed to integrate functionality between the different hardware components, for example by an API relationship between software elements.

Referring again to FIG. 6 and particularly storage 640, there are shown representative data structures to demonstrate functionality and structure of various embodiments. User logs 641 through 64X represent logs maintained by the service provider corresponding to each user/computer 651. Given the ability to distinguish between different users on a single computer 651, the logs may be kept separately for users or computers or both. As suggested by the more illustrative user log 641, one function of the log is to make a record of a user/computer Internet access information, such as the time of access, the destination accessed (e.g. website or address visited) and the size of the information accessed. Of course, the embodiments herein contemplate any level of log information that is commonly maintained or that may be useful for facilitating monitoring.

Also shown in storage 640, there are host logs 645 through 64X, which are logs maintained by the service provider corresponding to each host connected to the service provider or each host or address accessed by a user/computer. Thus, as suggested by the illustrative host log 645, the host log may maintain access information for each host or address (e.g. a website or a particular page on a website). In some embodiments, each access to the host or address is recorded in the log by, for example, the time of access, the size of the access and the origin, which refers to the computer/user that made the access. Like the user logs, the precise information retained in the host log may be any information that is known for such logs and certainly any other information that is useful for the purpose of monitoring.

Of course, user logs and host logs may be stored in any known manner such as in databases, spreadsheets, files or within objects. Further, the structures shown in FIG. 6 are illustrative only and not intended to suggest a necessary configuration requiring, for example common storage or separate storage for host logs, program logs, and software.

Figure 6A:
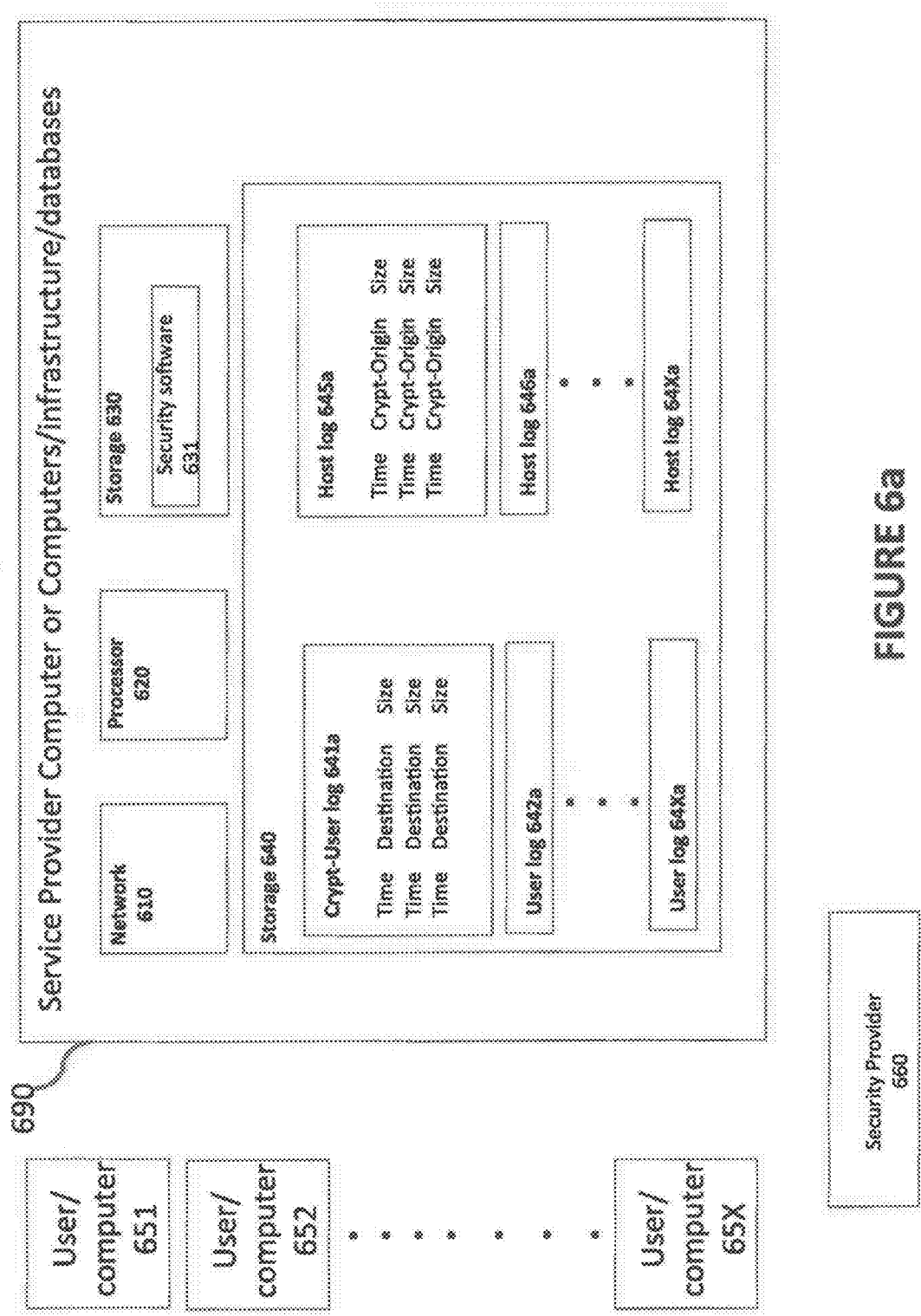
FIG. 6a is a embodiment of the invention related to user information held by a third party such as a service provider.

Some embodiments contemplate encrypting the log information for security purposes. Other embodiments involve encrypting only a portion of the log files so that an authority (e.g. law enforcement) may inspect encrypted logs without materially compromising privacy of the user/computer. Referring to FIG. 6a, there is shown an example version of FIG. 6 illustrating selective encryption of log information. As shown in FIG. 6a, host logs 645a through 64Xa now encrypt origin information so that inspection of the log may reveal the accessed host or address as well as information about each access, but does not reveal the users/computers involved in the access. Similarly, user logs 641a through 641x have encrypted computer/user information but would allow an inspection to reveal many aspects of each user/computer behavior without revealing the identity of the computer/user.

By employing selective encryption, many useful embodiments may be envisioned. For example, as part of an investigation, an authority may have access to host log 645a due to a host or network address that arouses suspicion. After examining host log 645a, the authority may wish to further investigate certain users/computers and may request the encrypted user logs so that a fairly thorough analysis may be made without compromising the identity of the user/computer. Further embodiments may be illustrated with respect to FIGS. 7 and 7a.

Figure 7:
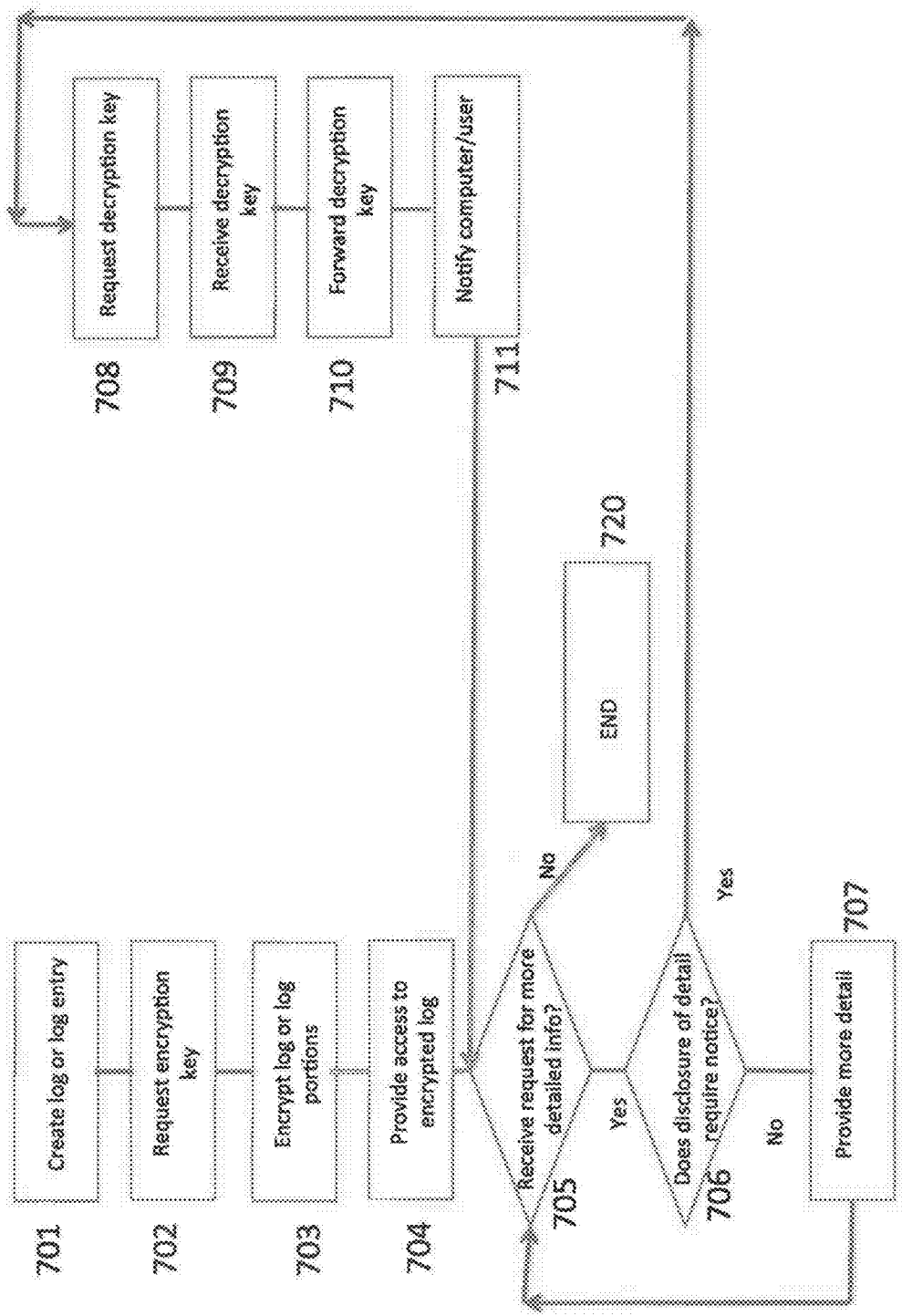
FIG. 7 is a process according to the invention for providing access to user information and notice to users.

Referring now to FIG. 7, there is shown a process for employing a system, such as shown in FIGS. 6 and 6a, to perform a monitoring function. In act 701 log information is created. While the log information of the illustration represents any information (e.g. files, media, metadata), this discussion will provide illustration with respect to user log files and host log files as shown in FIGS. 6 and 6a.

In act 702, a request is made to a security provider for an encryption key, the production of such keys as exemplarily illustrated with respect to FIG. 5. After production of the encryption key, the key is forwarded to the service provider for use in encrypting information. In some embodiments the request for an encryption key will include a descriptor and/or metadata as discussed above. In those embodiments, the key may have a deterministic relationship with the descriptor. In this manner, the keys may be rolled or changed as desired, for example, on a schedule or according to the data subject to encryption. One purpose for key rolling is to limit the amount of data subject to any particular key or key pair. In this manner, information disclosed to the authority can be minimized at least because any decryption key disclosure will only result in revealing (at most) the information subject to that key.

In act 703, the encryption key is employed to encrypt some or all log information. For this illustration, we shall discuss encryption of the origin information in host logs and user/computer (or any identifying information) in user logs.

In act 704, the authority may be provided with access to the host log information (with encrypted origin information) for potential inspection and analysis.

In act 705, a determination is made whether more detailed information is requested by the authority. Detailed information may include more non-sensitive log information or other non-identifying information, but it may also include information potentially violating the user/computer's privacy (for example, any identifying information).

As shown in act 720, if more detailed information is not requested by the authority, then for purposes of this discussion, the process ends (although interaction may continue for other reasons). If at act 705, however, more detailed information is requested, a second decision block arises to determine whether the requested information requires notification of the implicated user/computer. While this determination may be subject to a privacy policy or the service provider's rules, some embodiments provide for disclosure of non-identifying information without notice to the user/computer. In the context of this illustration, all identifying information has been encrypted in the user logs, so the altered user log may be shared with the authority without likely triggering a policy that requires notice to a user/computer (e.g. notice would be unnecessary if the policy only requires notice for the compromise of identifying information). Of course, other embodiments may call for encrypting more of (or all of) the user logs, in which case the disclosure of unencrypted versions of user log information would likely require notice to the implicated users/computers.

If the decision of act 706 determines that a requested disclosure does not require user/computer notice, then the process moves to act 707 and the requested detailed information is provided, after which the process returns to decision block 705 (discussed above). If, however, the decision at act 706 determines that the requested disclosure requires notice to the user/computer, then the process moves to act 708 for request of a decryption key. With respect to acts 708 through 710, the illustration assumes that information is encrypted so a decryption key is required. However, not every embodiment necessarily has perfect consistency between the quantum of encrypted data and the data for which the privacy policy requires notice to the user/computer. Therefore, it is possible that the decryption key acts may not be necessary.

At act 708 a request for a decryption key is made to the security provider. As with the decryption key, the request may include any or all of the following: identifying information regarding the encryption key, a descriptor, or metadata. The security provider either retrieves the key from a repository or makes a key using a process as illustrated with respect to FIG. 5 and the key is ultimately received in act 709 and forwarded as necessary in act 710. At this point, the observation is made that this illustration does not intend to confine the requestor and receiver roles for the acts discussed here. The invention expressly envisions that the authority or the service provider may interact independently with the security provider or that they may share the task in literally any combination according to a protocol. Thus, some of the acts regarding request and receipt of keys may be adjusted accordingly.

Finally, in act 711, the user/computer may be notified regarding the disclosure of information that was encrypted or simply according to the privacy policy. The notice to the user may take the form of an electronic communication such as an email, text, fax, telex, automated voice call, etc. The notice may also be posted to a website or portal for the user's perusal. Also, a combination of these notice techniques may be employed.

Figure 7A:
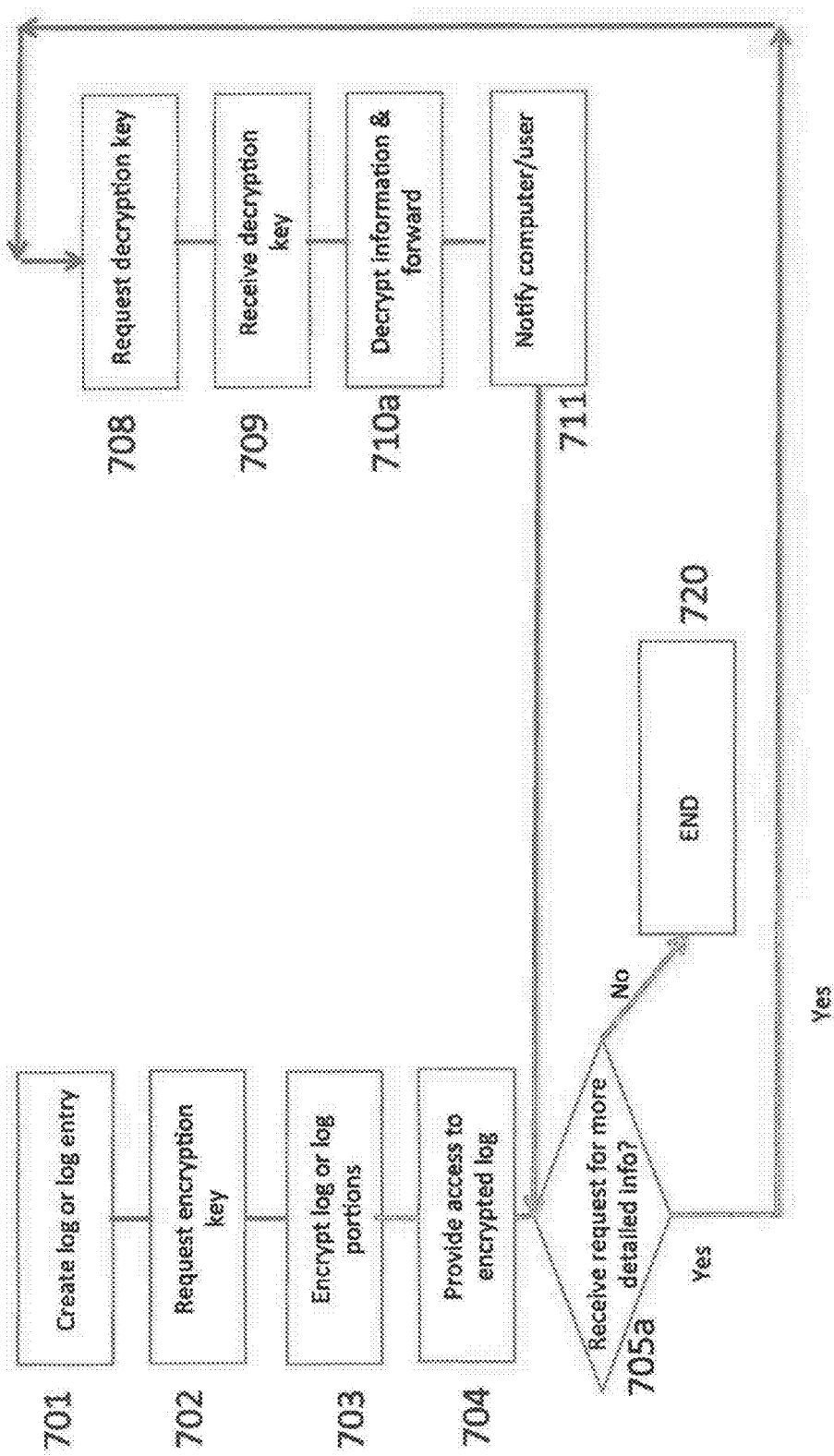
FIG. 7a is another process according to the invention for providing access to user information and notice to users.

In the example of FIG. 7, the discussion assumes that a decryption key is provided from the security provider, which will allow either of the service provider, the authority or both to decrypt any information in their possession that is subject to that key. The illustration in FIG. 7a is provided to show a differing assumption wherein the party with access to the log information (e.g. the authority and/or the service provider) provides encrypted information (retrieved from a log) to the service provider or the security provider for decryption. Thus, FIG. 7a differs from FIG. 7 as shown (e.g. with respect to FIG. 7, the decryption key is provided to the requestor and therefore all data will be compromised that was encrypted with that key, while in FIG. 7a only the requested data is decrypted and returned, other data encrypted by the same key would not necessarily be compromised). For illustration, in act 705a, the request for more detailed information includes encrypted information for which decryption is requested. Further, in act 710a, the information is decrypted and forwarded. As in the prior illustration, acts 708 and 709 may take differing forms depending upon how the service provider and the authority share responsibility. For example, in some embodiments the security provider performs the decryption, obviating the decryption key requests from the standpoint of the service provider (although the request certainly may apply within the security provider). In other embodiments, the service provider may perform the decryption thus requiring the decryption key request and receipt of acts 708 and 709. Finally, recall that some embodiments employ a security provider hardware device or module co-located with the service provider and this device/module may be logically part of the service provider or security provider, however chosen programmatically.

The following supplemental listing further illustrates potential embodiments within the contemplation of the description herein.

A first supplemental embodiment includes a method comprising the acts of: storing a master key value; providing a descriptor value; combining the master key with descriptor value to form a combination by replacing a portion of the master key with bits derived from the descriptor value; seeding a PRNG with the combination; applying a PRNG for a plurality of cycles; and after the plurality of cycles, using the output of one or more subsequent cycles from the PRNG to derive a public and private key pair.

A first variation of the first supplemental embodiment includes the first supplemental embodiment wherein the descriptor value is a date value related to the date of a log entry, and the public key is used to encrypt at least a portion of the log entry.

A second variation of the first supplemental embodiment includes the first supplemental embodiment wherein the act of combining the master key with the descriptor value further comprises hashing the descriptor value prior to using its bits to replace bits of the master key.

A third variation of the first supplemental embodiment includes the first supplemental embodiment wherein the descriptor relates to dates or times of a first set of log entries and the public key is used to encrypt at least a portion of each of a plurality of log entries belonging to the set.

A first sub variation to the third variation includes the third variation and further comprising the further acts of: providing a second descriptor value, the second descriptor value related to the dates or times of a second set of log entries, wherein the second set of log entries is from the same log as the first set of log entries but is not identical; combining the master key with the second descriptor value to form a second combination by replacing a portion of the master key with bits derived from the second descriptor value; applying the same PRNG to the second combination for the same number of cycles that were applied to the combination; and using one or more subsequent cycles from the PRNG to derive a second public and second private key pair.

A sub variation to the first sub variation includes the first sub variation and further comprises the act of continuing to produce new sets of private and public key pairs by creating combinations using the same master key and differing descriptors, wherein each descriptor relates to date values of log entries and all of the log entries logically belong to the same log.

A fourth variation of the first supplemental embodiment includes the first supplemental embodiment wherein the descriptor value relates to file metadata and the public key is used to encrypt at least a portion of the file.

A first sub variation to the fourth variation includes the fourth variation and further comprising the act of producing new sets of private and public key pairs by creating a plurality of new combinations using the same master key and differing descriptors, wherein each descriptor relates to metadata of each of a plurality of files, and a created public key is used to encrypt at least a portion of each of a plurality of the files.

A second supplemental embodiment includes a method for producing encryption keys comprising: storing a descriptor in a first memory; storing a master key in a second memory; combining the descriptor with the master key by using a microprocessor to form a combination value; seeding a PRNG with the combination value; storing the output of the first PRNG cycle in a third memory; employing a plurality of successive PRNG cycles by seeding the Nth cycle of the PRING with the output from the (N−1)th cycle of the PRNG; and developing a first private key and a first public key pair based upon outputs from the PRNG.

A first variation of the second supplemental embodiment includes the second supplemental embodiment wherein the first memory, second memory and third memory are all part of the same addressable memory space in a single computer system.

A second variation of the second supplemental embodiment includes the second supplemental embodiment wherein the descriptor is a deterministic value derived from information regarding data selected to be encrypted with the first public key; the microprocessor forms the combination value by replacing a portion of the bits comprising the master key with bits derived from the descriptor; and the PRNG is a MersenneTwister.

A sub variation to the second variation includes the second variation wherein the PRNG is cycled a total of at least 700,000 times.

A third variation of the second supplemental embodiment includes the second supplemental embodiment comprising the additional acts of: using the first public key to encrypt a portion of one or more records regarding a user's access to a network; after performing the encryption, allowing access to the one or more records to an authority; receiving a request from the authority for a decrypted version of the one or more records; employing the private key to respond to the request from the authority; and providing notice to the user regarding the disclosure of the one or more records to the authority.

A sub variation to the third variation includes the third variation wherein the network comprises one or more of the Internet, a corporate network, a government network, or a secure network.

A third supplemental embodiment includes computer program product embodied on a non-transitory computer readable medium comprising: computer code for creating a user log for each of a plurality of users, each user log comprising a list of network resources accessed by the user and the time or date of access; computer code for creating a host log for each of a plurality of network resources, each host log comprising a list of users that have accessed each of the plurality of network resources and the time or date of each access; computer code for requesting one or more public keys for use in encrypting select information in the user log or host log; computer code for receiving the requested one or more public keys and using the keys to encrypt all user identifying information in the host log, wherein the key or keys used for such encryption have been derived from information regarding the log entries being encrypted; computer code for allowing access to the host log by an authority after encrypting all user identifying information; computer code for receiving a request from the authority for more information regarding one or more entries in the host log; computer code for providing responsive information; computer code for notifying one or more users whose encrypted identifying information has been revealed by the responsive information.

A first variation of the third supplemental embodiment includes the third supplemental embodiment further comprising computer code for encrypting one or more user logs and wherein the computer code for providing responsive information includes computer code for facilitating access to decrypted user log information regarding the users implicated by the request from the authority.

A second variation of the third supplemental embodiment includes the third supplemental embodiment further comprising the computer code for encrypting user identifying information from one or more user logs and wherein the computer code for providing responsive information includes computer code for facilitating access to the encrypted form of the user logs implicated by the request from the authority.

A third variation of the third supplemental embodiment includes the third supplemental embodiment further comprising the computer code for receiving a request from the authority for more user identifying information related to a user log or a host log entry.

A fourth variation of the third supplemental embodiment includes the third supplemental embodiment wherein the computer code for providing responsive information includes computer code for providing a decryption key to the authority, the decryption key having been derived from information regarding the log entries to be decrypted.

A fifth variation of the third supplemental embodiment includes the third supplemental embodiment wherein the computer code for receiving a request from the authority for more information regarding one or more entries in the host log includes computer code for receiving a quantum of encrypted information extracted from a host log; and the computer code for providing responsive information includes (i) computer code for decrypting the quantum of encrypted information using a decryption key having been derived from information regarding the log entry to be decrypted, and (ii) computer code for providing the decrypted quantum of information to the authority.

A fourth supplemental embodiment includes a computer program product embodied on a non-transitory computer readable medium comprising: computer code for storing a descriptor; computer code for storing a master key; computer code for combining the descriptor with the master key to form a combination value; computer code for seeding a PRNG with the combination value; computer code for storing the output of the first PRNG cycle; computer code for causing a plurality of successive PRNG cycles by seeding the Nth cycle of the PRING with the output from the (N–1)th cycle of the PRNG; and computer code for developing a first private key and a first public key pair based upon outputs from the PRNG.

A first variation of the fourth supplemental embodiment includes the fourth supplemental embodiment wherein the computer code for combining the descriptor with the master key further comprises computer code for forming the combination value by replacing a portion of the bits comprising the master key with bits derived from the descriptor.

A fifth supplemental embodiment includes a computer program product embodied on a non-transitory computer readable medium comprising: computer code for storing a master key value; computer code for providing a descriptor value; computer code for combining the master key with descriptor value to form a combination by replacing a portion of the master key with bits derived from the descriptor value; computer code for seeding a PRNG with the combination; computer code for applying a PRNG for a plurality of cycles, and computer code for acting after the plurality of cycles, and using the output of one or more subsequent cycles from the PRNG to derive a public and private key pair.

A first variation of the fifth supplemental embodiment includes the fifth supplemental embodiment wherein the descriptor value is a date value related to the date of a log entry, and the public key is used to encrypt at least a portion of the log entry.

A second variation of the fifth supplemental embodiment includes the fifth supplemental embodiment wherein the act of combining the master key with the descriptor value further comprises hashing the descriptor value prior to using its bits to replace bits of the master key.

One skilled in the art will recognize the many possible variations and combinations of the inventions described herein. None of these illustrative examples or described embodiments are intended to limit the scope of application for the concepts disclosed herein.

What is claimed is:

1. A method comprising the acts of:
   storing a master key value associated with a user;
   generating a public and private key pair including a public key and a private key for content of the user, including:
      obtaining a descriptor value from the content, and modifying a portion of the master key value using the descriptor value by:
      deriving a series of bits from the descriptor value, determining a size of the series of bits derived from the descriptor value, and replacing a portion of the master key value equivalent to the size of the series of bits derived from the descriptor value, with the series of bits derived from the descriptor;
   seeding a pseudo random number generator (PRNG) with the modified master key value;
   applying the PRNG to a result of seeding the PRNG for a plurality of cycles;
   after the plurality of cycles, using an output of one or more subsequent cycles from the PRNG to derive the public and private key pair.

2. The method of claim 1 wherein the descriptor value is a date value related to a date of a log entry, and the public key is used to encrypt at least a portion of the log entry.

3. The method of claim 1 wherein combining the master key value with the descriptor value further comprises hashing the descriptor value prior to using bits derived from the descriptor value to replace bits of the master key value.

4. The method of claim 1 wherein the descriptor value relates to dates or times of a first set of log entries and the public key is used to encrypt at least a portion of each of a plurality of log entries belonging to the first set of log entries.

5. The method of claim 4 comprising the further acts of:
   providing a second descriptor value, the second descriptor value related to the dates or times of a second set of log entries, wherein the second set of log entries is from a same log as the first set of log entries and is not identical to the first set of log entries;
   combining the master key value with the second descriptor value to form a second modified master key value by replacing a portion of the master key value with bits derived from the second descriptor value;
   applying, to the second modified master key value, the PRNG that was applied to the first modified master key value for the same number of cycles that were applied to the first modified master key value; and
   using one or more subsequent cycles from the PRNG to derive a second public and second private key pair.

6. The method of claim 5 further comprising continuing to produce new sets of private and public key pairs by creating new modified master key values using the master key value and differing descriptor values, wherein each of the differing descriptor values relates to date values of log entries, wherein the log entries logically belong to the same log.

7. The method of claim 1 wherein the descriptor value relates to meta data of a file and the public key is used to encrypt at least a portion of the file.

8. The method of claim 7 further comprising producing new sets of private and public key pairs by creating a plurality of new modified master key values using the master key value and differing descriptor values, wherein each descriptor value relates to metadata of each of a plurality of files, and a created public key is used to encrypt at least a portion of each of the plurality of files.

9. A method for producing encryption keys comprising:
   storing a descriptor value for content of a user in a first memory;
   storing a master key value associated with a user in a second memory;
   generating a public and private key pair for content of the user, including:
      modifying a portion of the master key value using the descriptor value by using a microprocessor to form a combination value by:
         deriving a series of bits from the descriptor value,
         determining a size of the series of bits derived from the descriptor value,
         replacing a portion of the master key value equivalent to the size of the series of bits derived from the descriptor value with the series of bits derived from the descriptor;
      seeding a pseudo random number generator (PRNG) with the modified master key value;
      storing an output of a first PRNG cycle in a third memory;
      employing a plurality of successive PRNG cycles by seeding an Nth cycle of the PRNG with the output from an (N−1)th cycle of the PRNG; and
      developing the private key and the public key pair based upon outputs from the PRNG cycles.

10. The method of claim 9 wherein the first memory, second memory and third memory are all part of a same addressable memory space in a single computer system.

11. The method of claim 9 wherein:
    the descriptor is a deterministic value derived from information regarding data selected to be encrypted with the public key; and
    the PRNG is a MersenneTwister.

12. The method of claim 11 wherein the PRNG is cycled a total of at least 700,000 times.

13. The method of claim 9 comprising the additional acts of:
    using the public key to encrypt a portion of one or more records regarding a user's access to a network;
    after performing the encryption, allowing access to the one or more records to an authority;
    receiving a request from the authority for a decrypted version of the one or more records;
    employing the private key to respond to the request from the authority; and
    providing notice to the user regarding the access to the one or more records to the authority.

14. The method of claim 13 wherein the network comprises one or more of the Internet, a corporate network, a government network, or a secure network.

15. A non-transitory computer readable medium on which are stored instructions, comprising instructions which, when executed by a processor, causes the processor to:
    store a descriptor value for content of a user;
    store a master key value associated with a user;
    generate a public and private key pair for content of the user, including instructions which cause the processor to:
    modify a portion of the master key value using the descriptor value comprising instructions that when executed cause the processor to:
       derive a series of bits from the descriptor value,
       determine a size of the series of bits derived from the descriptor value,
       replace a portion of the master key value equivalent to the size of the series of bits derived from the descriptor value with the series of bits derived from the descriptor value;
    seed a pseudo random number generator (PRNG) with the modified master key value;
    store an output of a first PRNG cycle seeded with the modified master key value;
    cause a plurality of successive PRNG cycles by seeding an Nth cycle of the PRNG with the output from an (N−1)th cycle of the PRNG; and
    develop the private key and the public key pair based upon outputs from the PRNG cycles.

16. A non-transitory computer readable medium on which are stored instructions, comprising instructions which, when executed by a processor, cause the processor to:
    store a descriptor value for content of a user;
    store a master key value associated with a user;
    generate a public and private key pair for content of the user, including instructions which cause the processor to:
    modify a portion of the master key value using the descriptor value comprising instructions that when executed cause the processor to:
       derive a series of bits from the descriptor value,
       determine a size of the series of bits derived from the descriptor value,
       replace a portion of the master key value equivalent to the size of the series of bits derived from the descriptor value with the series of bits derived from the descriptor value;
    seed a pseudo random number generator (PRNG) with the modified master key value;
    apply a PRNG for a plurality of cycles, and
    after the plurality of cycles, using an output of one or more subsequent cycles from the PRNG to derive the public and private key pair.

17. The computer readable medium of claim 16 wherein the descriptor value is a date value related to the date of a log entry, and the public key is used to encrypt at least a portion of the log entry.

18. The computer readable medium of claim 16 wherein instructions that when executed cause the processor to modify a portion of the master key value further comprise instructions that when executed cause the processor to hash the descriptor value prior to using its bits to replace bits of the master key.

* * * * *